US012768747B2

(12) United States Patent
Nakamura et al.

(10) Patent No.: US 12,768,747 B2
(45) Date of Patent: Oct. 20, 2026

(54) EQUIPMENT AND METHOD FOR CHARACTERIZING BIDIRECTIONAL CROSSTALK

(71) Applicant: NTT, Inc., Tokyo (JP)

(72) Inventors: Atsushi Nakamura, Musashino (JP); Yusuke Koshikiya, Musashino (JP)

(73) Assignee: NTT, Inc., Tokyo (JP)

( * ) Notice: Subject to any disclaimer, the term of this patent is extended or adjusted under 35 U.S.C. 154(b) by 74 days.

(21) Appl. No.: 18/998,920

(22) PCT Filed: Aug. 15, 2022

(86) PCT No.: PCT/JP2022/030887

§ 371 (c)(1),
(2) Date: Jan. 27, 2025

(87) PCT Pub. No.: WO2024/038487

PCT Pub. Date: Feb. 22, 2024

(65) Prior Publication Data

US 2026/0056085 A1 Feb. 26, 2026

(51) Int. Cl.
*G01M 11/00* (2006.01)
*G01M 11/02* (2006.01)

(52) U.S. Cl.
CPC .............................. *G01M 11/0285* (2013.01)

(58) Field of Classification Search
CPC .. G01M 11/00; G01M 11/0285; G01M 11/33; G01M 11/02
See application file for complete search history.

(56) References Cited

U.S. PATENT DOCUMENTS

| | | | | |
|---|---|---|---|---|
| 7,228,024 | B2 * | 6/2007 | Wang | G01M 11/3154 356/73.1 |
| 8,947,232 | B2 * | 2/2015 | Strong | G01H 9/004 385/100 |
| 2021/0310897 | A1 * | 10/2021 | Oda | G01M 11/39 |

FOREIGN PATENT DOCUMENTS

| | | | | |
|---|---|---|---|---|
| CN | 111555803 | A | 8/2020 | |
| EP | 0681172 | A2 * | 11/1995 | G01M 11/3181 |

OTHER PUBLICATIONS

A. Nakamura et al., "Optical Time Domain Reflectometry for Simultaneously Characterizing Forward and Backward Crosstalk along Multi-Core Fibers", Journal of Lightwave Technology, Sep. 15, 2022, https://ieeexplore.ieee.org/document/9826747, DOI:10.1109/JLT.2022.3190019.

(Continued)

*Primary Examiner* — Abdullahi Nur
(74) *Attorney, Agent, or Firm* — Harness, Dickey & Pierce, P.L.C.

(57) ABSTRACT

The present disclosure is a device that detects each loss occurrence point of an optical fiber under test by using at least one of a loss distribution of first backscattered light from a first core or a loss distribution of second backscattered light from a second core, calculates a mode coupling matrix $T_i$ at an i-th loss occurrence point of the optical fiber under test, calculates a fiber length $L_i$ of an i-th fiber section having a separation at the i-th loss occurrence point of the optical fiber under test, and calculates bidirectional crosstalk in the first core or the second core by using the calculated mode coupling matrix $T_i$ and fiber length $L_i$ and using a fiber loss factor α and power coupling coefficient h of the optical fiber under test measured in advance.

8 Claims, 7 Drawing Sheets

(56) References Cited

OTHER PUBLICATIONS

A. Nakamura et al., “Method of Estimating Inter-Core Crosstalk for Constructing Uncoupled Multi-Core Fiber Transmission Line”, OFC 2022, 2022, M1 E.3.
Tomokazu Oda et al., “Crosstalk test method for constructing uncoupled multi-core fiber transmission line”, IEICE technical report OFT2021-78, Feb. 2022.

* cited by examiner

EQUIPMENT AND METHOD FOR CHARACTERIZING BIDIRECTIONAL CROSSTALK

CROSS-REFERENCE TO RELATED APPLICATIONS

This application is a U.S. National Phase Application under 35 U.S.C. 371 of International Application No. PCT/JP2022/030887, filed Aug. 15, 2022. The entire disclosure of the above application is incorporated herein by reference.

TECHNICAL FIELD

The present disclosure relates to a device and method for evaluating bidirectional crosstalk in a multi-core fiber.

BACKGROUND ART

An uncoupled multi-core fiber is one of promising optical fibers as a medium for achieving future large-capacity optical communication. Inter-core crosstalk is an important parameter that limits a transmission capacity (see, for example, Non Patent Literatures 1 to 3).

In order to reduce an influence of the inter-core crosstalk, there has been proposed a method of alternating signal propagation directions of adjacent cores (bidirectional transmission). A magnitude of the crosstalk is determined on the basis of a loss of each core in an uncoupled multi-core fiber transmission line and inter-core mode coupling. The loss and mode coupling occurring in the optical fiber itself, an input/output device, or the like can be measured in manufacturing the same.

Meanwhile, an influence of a bend, connection, or the like, arising in constructing a transmission line, on the crosstalk needs to be evaluated each time. There are operational difficulties in a test from both ends of the optical fiber in constructing the transmission line, which involves a device for testing the crosstalk from one end of the optical fiber such as an optical pulse tester (OTDR).

Non Patent Literature 1 discloses a method for measuring, by using an OTDR, inter-core crosstalk (bidirectional crosstalk) in bidirectional transmission in an uncoupled multi-core fiber. The method of Non Patent Literature 1 includes injecting an optical pulse into one core of the multi-core fiber, measuring intensities of backscattered light output from the core (input core) and its adjacent core, and calculating bidirectional crosstalk from values thereof.

However, in the method of Cited Document 1, the intensity of the backscattered light output from the adjacent core is extremely smaller than the intensity of the backscattered light from the input core, and thus a dynamic range of the OTDR is insufficient to cause measurement with difficulty unless the crosstalk is large to some extent.

Meanwhile, Non Patent Literatures 2 and 3 disclose a method for estimating unidirectional crosstalk from loss characteristics that can be easily measured. However, Non Patent Literatures 2 and 3 do not disclose a method for calculating bidirectional crosstalk.

That is, small inter-core crosstalk in the multi-core fiber causes impossibility of evaluation of the influence of the bend, connection, and the like, arising in constructing the transmission line, on the bidirectional crosstalk.

CITATION LIST

Non Patent Literature

Non Patent Literature 1: A. Nakamura et al., "Optical Time Domain Reflectometry for Simultaneously Characterizing Forward and Backward Crosstalk along Multi-Core Fibers", Journal of Lightwave Technology. https://ieeexplore.ieee.org/document/9826747DOI: 10.1109/JLT.2022.3190019 Non Patent Literature 2: A. Nakamura et al., "Method of Estimating Inter-Core Crosstalk for Constructing Uncoupled Multi-Core Fiber Transmission Line", OFC 2022, M1E.3. Non Patent Literature 3: Tomokazu Oda et al., "Crosstalk test method for constructing uncoupled multi-core fiber transmission line", IEICE technical report OFT2021-78.

SUMMARY OF INVENTION

Technical Problem

An object of the present disclosure is to enable evaluation of bidirectional crosstalk in an uncoupled multi-core fiber transmission line even with small inter-core crosstalk.

Solution to Problem

The present disclosure enables calculation of an influence of a bend, connection, or the like, arising in constructing a transmission line, on bidirectional crosstalk, from loss characteristics that can be easily measured. Therefore, it can provide a device and method capable of evaluating an influence of a bend or connection, in an uncoupled multi-core fiber transmission line, on bidirectional crosstalk by means of a test from one end of the transmission line even with small inter-core crosstalk in the multi-core fiber.

A device of the present disclosure includes:

a test light generation unit for generating an optical pulse;

a reception unit for receiving first backscattered light from a first core included in an optical fiber under test when the optical pulse is injected into one end of the first core and second backscattered light from a second core adjacent to the first core when the optical pulse is injected into one end of the second core; and an arithmetic processing unit for calculating bidirectional crosstalk in the first core or the second core by using the first backscattered light and the second backscattered light received by the reception unit.

In a method of the present disclosure, a test light generation unit and a reception unit measure first backscattered light from a first core included in an optical fiber under test when an optical pulse is injected into one end of the first core, the test light generation unit and the reception unit measure second backscattered light from a second core adjacent to the first core when an optical pulse is injected into one end of the second core, and an arithmetic processing unit calculates bidirectional crosstalk in the first core or the second core by using the first backscattered light and the second backscattered light received by the reception unit.

The arithmetic processing unit detects a loss occurrence point of the optical fiber under test by using at least one of a loss distribution of the first backscattered light or a loss distribution of the second backscattered light, calculates a mode coupling matrix $T_i$ at an i-th loss occurrence point of the optical fiber under test, calculates a fiber length $L_i$ of an i-th fiber section having a separation at the i-th loss occurrence point of the optical fiber under test, and calculates bidirectional crosstalk in the first core or the second core by using the calculated mode coupling matrix $T_i$ and fiber length $L_i$ and using a fiber loss factor $\alpha$ and power coupling coefficient h of the optical fiber under test measured in advance.

The arithmetic processing unit may calculate backscattered light $P_{n(bs)}$ accumulated along an entire fiber length L of the second core, occasioned by injecting signal light into the one end of the first core, by using the mode coupling matrix $T_i$ at the i-th loss occurrence point, a mode coupling matrix $M_i$ indicating mode coupling in the i-th fiber section, and a matrix B indicating backscattering approximated by constants, calculate signal light $P_{n(out)}$ output from the one end of the second core, occasioned by injecting signal light into the other end of the second core, and calculate the bidirectional crosstalk in the second core by calculating a ratio between the backscattered light $P_{n(bs)}$ and the signal light $P_{n(out)}$.

The arithmetic processing unit may calculate the mode coupling matrix $M_i$ indicating the mode coupling in the i-th fiber section of the optical fiber under test by using the calculated fiber length $L_i$ and the fiber loss factor $\alpha$ and power coupling coefficient h of the optical fiber under test, calculate a fiber length from a position of an inlet to a position z of a fiber section k and calculate a mode coupling matrix $M_k(z)$ indicating mode coupling from the inlet to the position z of the fiber section k of the optical fiber under test by using the calculated fiber length and the fiber loss factor $\alpha$ and power coupling coefficient h of the optical fiber under test, and apply the calculated mode coupling matrices $T_i$, $M_i$, and $M_k(z)$, the matrix B indicating backscattering approximated by constants, and signal light $P_{in(1)}$ injected into the one end of the first core to Equations (3) to (6) to calculate backscattered light $P_{n(bs)}$ in the second core.

The arithmetic processing unit may calculate the mode coupling matrix $M_i$ indicating the mode coupling in the i-th fiber section of the optical fiber under test by using the calculated fiber length $L_i$ and the fiber loss factor $\alpha$ and power coupling coefficient h of the optical fiber under test, and apply the calculated mode coupling matrices $T_i$ and $M_i$ and signal light $P_{in(2)}$ injected into the other end of the second core to Equation (14) to calculate the signal light $P_{n(out)}$ in the second core.

The arithmetic processing unit may calculate first coupling efficiency nu at the i-th loss occurrence point of the optical fiber under test by using the loss distribution of the first backscattered light, calculate second coupling efficiency $n_{22}$ at the i-th loss occurrence point of the optical fiber under test by using the loss distribution of the second backscattered light, and calculate the mode coupling matrix $T_i$ at the i-th loss occurrence point of the optical fiber under test by using the calculated first coupling efficiency nu and second coupling efficiency $n_{22}$.

Note that the above disclosures can be combined in any possible manner.

Advantageous Effects of Invention

The present disclosure can enable evaluation of bidirectional crosstalk in an uncoupled multi-core fiber transmission line even with small inter-core crosstalk.

DESCRIPTION OF EMBODIMENTS

Hereinafter, embodiments of the present disclosure will be described in detail with reference to the drawings. Note that the present disclosure is not limited to the embodiments described below. Those embodiments are merely examples, and the present disclosure can be carried out in forms with various modifications and improvements based on the knowledge of those skilled in the art. Note that components having the same reference signs in the present specification and the drawings indicate the same components.

Figure 1:
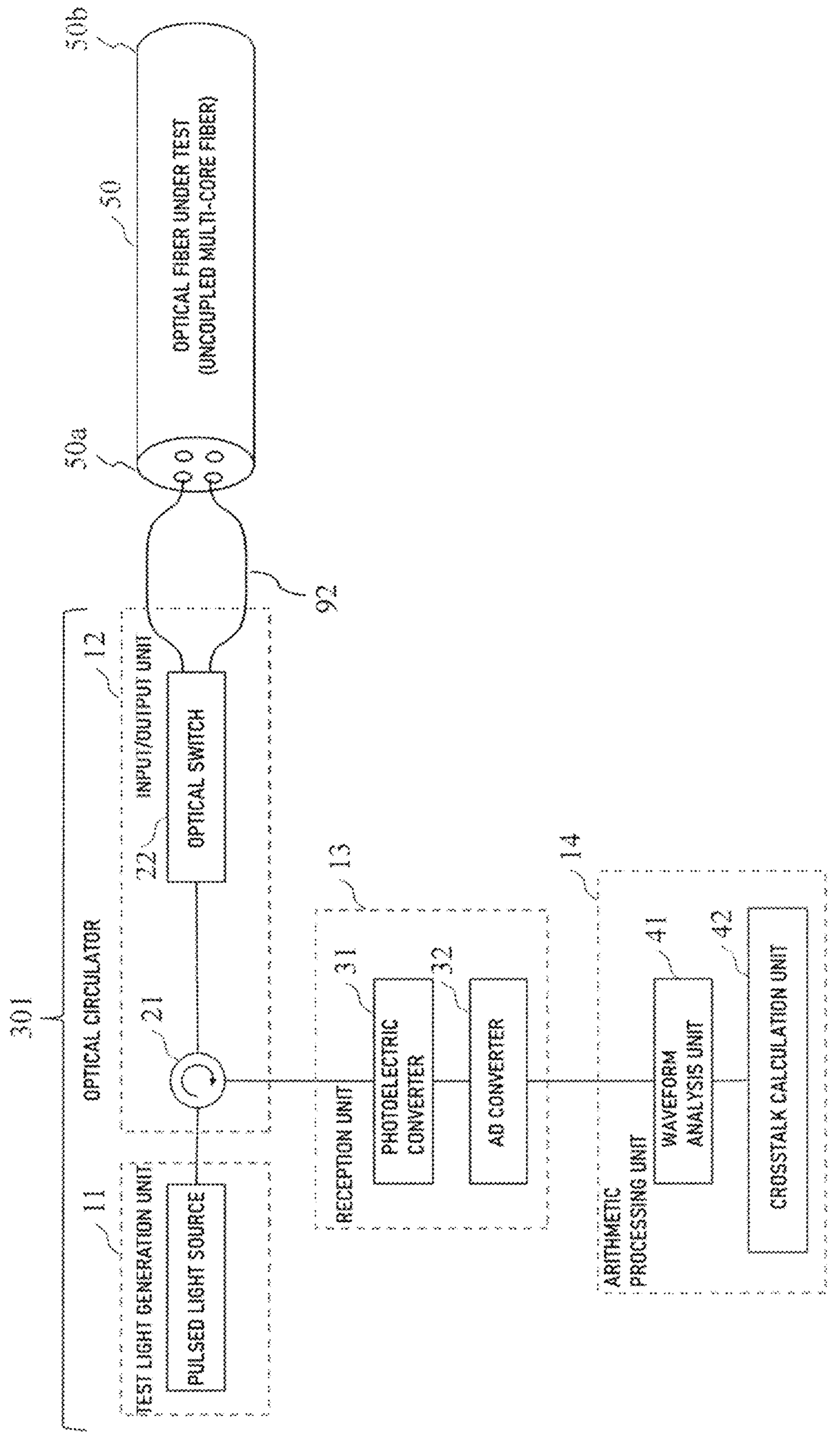
FIG. 1 is a diagram illustrating a configuration of an optical transmission line test device 301 of the present embodiment.

FIG. 1 is a diagram illustrating an exemplary embodiment of a device of the present disclosure. An optical transmission line test device 301 is a device that is capable of measuring a transmission loss of any core included in an optical fiber 50 under test. The optical fiber 50 under test is an uncoupled multi-core fiber including two or more cores. FIG. 1 illustrates an example where the optical fiber 50 under test includes four cores.

In the present disclosure, bidirectional crosstalk is calculated by using two cores included in the optical fiber 50 under test. Because the two cores are selected at discretion, in the present embodiment, a first core will be referred to as a core #m, and a second core will be referred to as a core #n.

The optical transmission line test device 301 includes a test light generation unit 11 that generates an optical pulse, an input/output unit 12 that injects the optical pulse into the optical fiber 50 under test and further outputs backscattered light in the optical fiber 50 under test, a reception unit 13 that measures an intensity of the backscattered light, and an arithmetic processing unit 14 that analyzes measurement data from the reception unit 13.

The test light generation unit 11 includes a pulsed light source that outputs pulsed light having a wavelength selected at discretion.

The input/output unit 12 includes, for example, an optical circulator 21 that outputs the backscattered light in the optical fiber 50 under test to the reception unit 13 and an optical switch 22 that switches to a core connected to the optical circulator 21, among the cores included in the optical fiber 50 under test. The optical switch 22 and the optical fiber 50 under test are connected by an input/output device 92 or the like.

The reception unit 13 includes a photoelectric converter 31 that converts the backscattered light into an electric signal corresponding to a light intensity thereof and an AD converter 32 that converts an analog signal, from the photoelectric converter 31, into a digital signal.

The arithmetic processing unit 14 includes a waveform analysis unit 41 that generates a backscattered waveform by using the digital signal from the AD converter 32, and a crosstalk calculation unit 42 that calculates crosstalk by using the backscattered waveform obtained by the waveform analysis unit 41.

Figure 2:
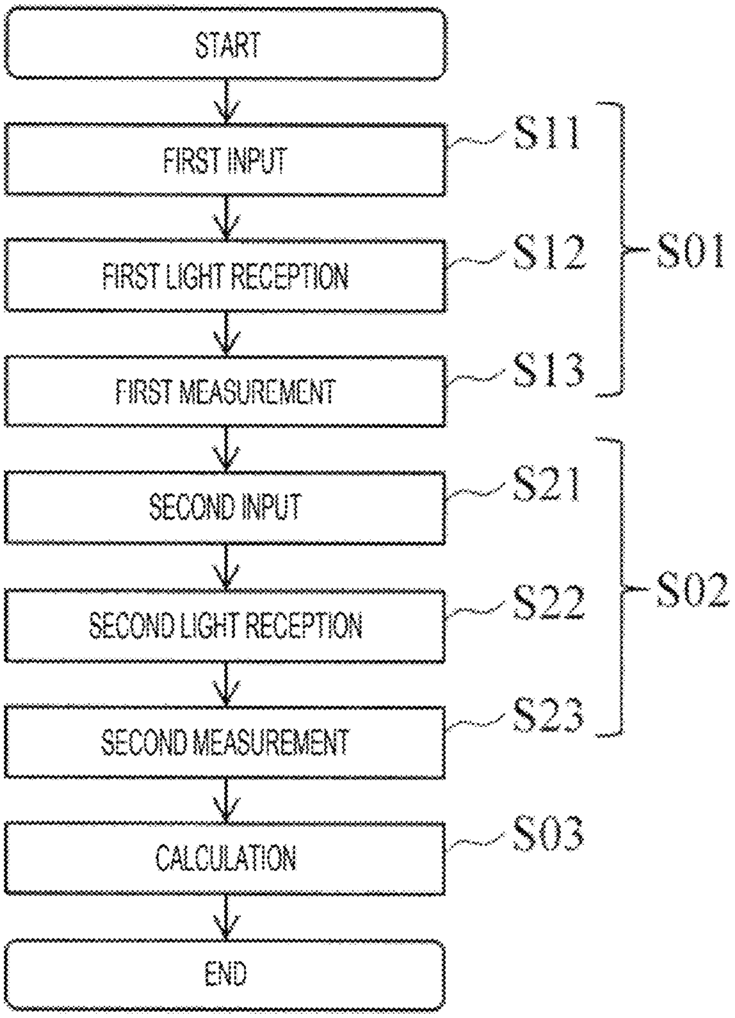
FIG. 2 is a diagram illustrating a test method performed by the optical transmission line test device 301.

FIG. 2 is a diagram illustrating a test method performed by the optical transmission line test device 301.

Step S01: in a first input procedure S11, a first light receiving procedure S12, and a first measurement procedure S13, an optical pulse is injected into one end 50*a* of the core #m of the optical fiber 50 under test, and backscattered light R1 (first backscattered light) in the core #m is measured.

Step S02: in a second input procedure S21, a second light receiving procedure S22, and a second measurement procedure S23, an optical pulse is injected into one end 50*a* of the core #n of the optical fiber 50 under test, and backscattered light R2 (second backscattered light) in the core #n is measured.

Here, the optical pulses used in the first input procedure S11 and the second input procedure S21 may have the same or different optical powers.

In a calculation procedure S03, the arithmetic processing unit 14 executes the following processing.

The waveform analysis unit 41 calculates a loss distribution generated in the core #m by using the backscattered light R1.

The waveform analysis unit 41 calculates a loss distribution generated in the core #n by using the backscattered light R2.

The crosstalk calculation unit 42 calculates an influence of a bend or connection on bidirectional crosstalk by using the loss distributions in the cores #m and #n. Details will be described below.

Figure 3:
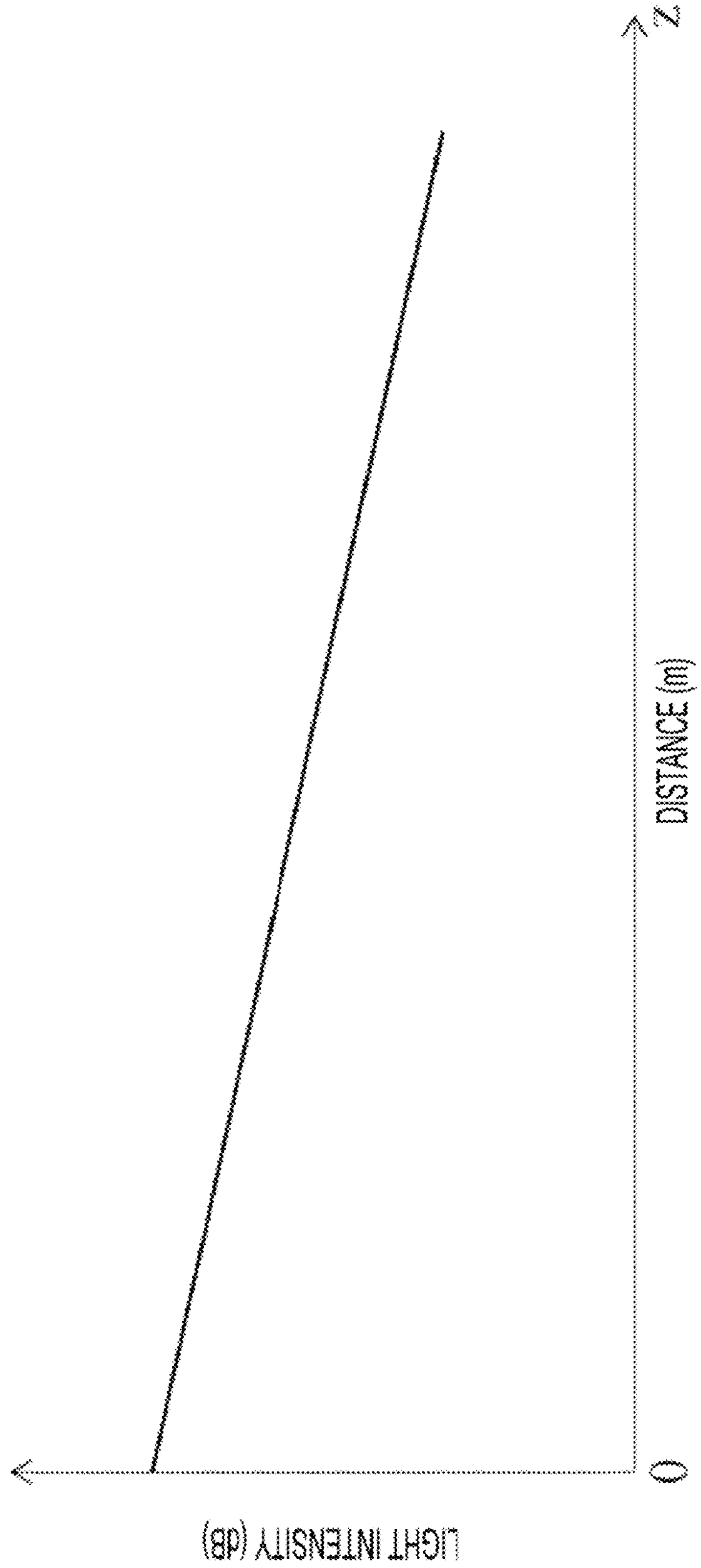
FIG. 3 illustrates an example of a loss distribution of backscattered light.
Figure 4:
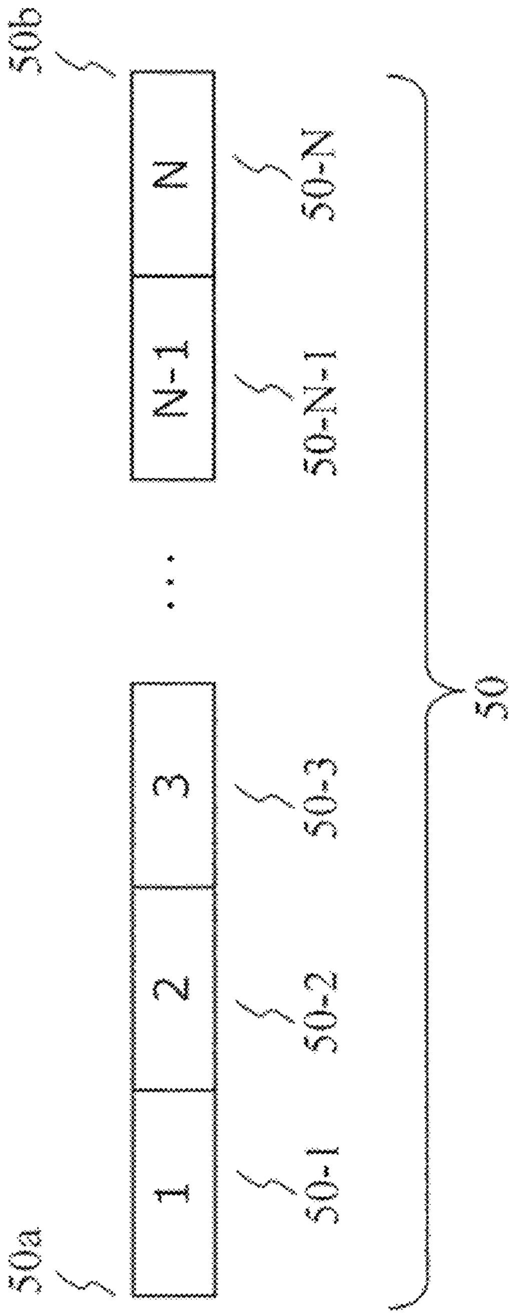
FIG. 4 illustrates a configuration example of an optical transmission line of the present embodiment.

FIG. 3 illustrates an example of the loss distribution obtained by the waveform analysis unit 41. When the optical fiber 50 under test has a bend point, a connection point, or the like, a loss occurs at that point. Therefore, the crosstalk calculation unit 42 detects each loss occurrence point of the optical fiber 50 under test. As illustrated in FIG. 4, the optical fiber 50 under test having N−1 loss occurrence points can be considered as a transmission line in which N uncoupled multi-core fibers are connected in series. Hereinafter, the present invention will be described in detail where the loss occurrence point is referred to as a connection point and each transmission line connected in series is referred to as the i-th fiber section having a separation at the i-th loss occurrence point.

(Definition of Crosstalk)

Figure 5:
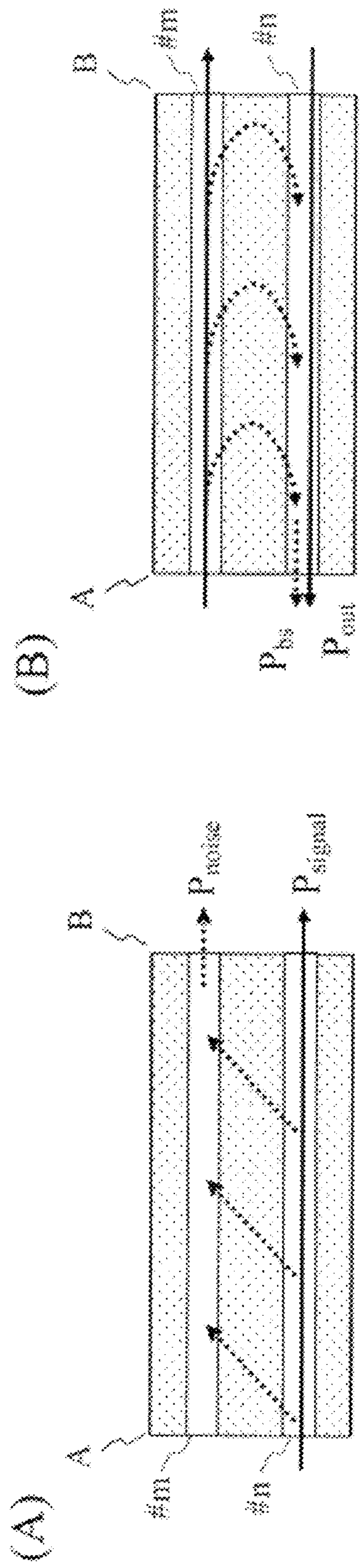
FIG. 5 is a diagram illustrating definition of crosstalk.

Generally, the crosstalk is a ratio of optical power $P_{noise}$ of a signal signifying interruption to optical power $P_{signal}$ of a signal signifying transmission. Crosstalk XT in unidirectional transmission, where signal light is injected into one end A of the core #n, is a power ratio ($XT=P_{noise}/P_{signal}$) of leakage light $P_{noise}$ output from the core #m adjacent thereto to signal light $P_{signal}$ originating from the injected signal light and output from the other end B of the core #n (FIG. 5(A)). Meanwhile, provided that leakage light from a non-adjacent core is sufficiently small, crosstalk $XT_b$ in bidirectional transmission, where one ray of signal light is injected into the other end B of the core #n and another ray of signal light is injected into one end A of the core #m adjacent thereto, is a power ratio ($XT_b=P_{bs}/P_{out}$) of backscattered light $P_{bs}$ originating from the latter injected signal light and output from the one end A of the core #n to signal light $P_{out}$ originating from the former and output from the one end A of the core #n (FIG. 5(B)).

Figure 6:
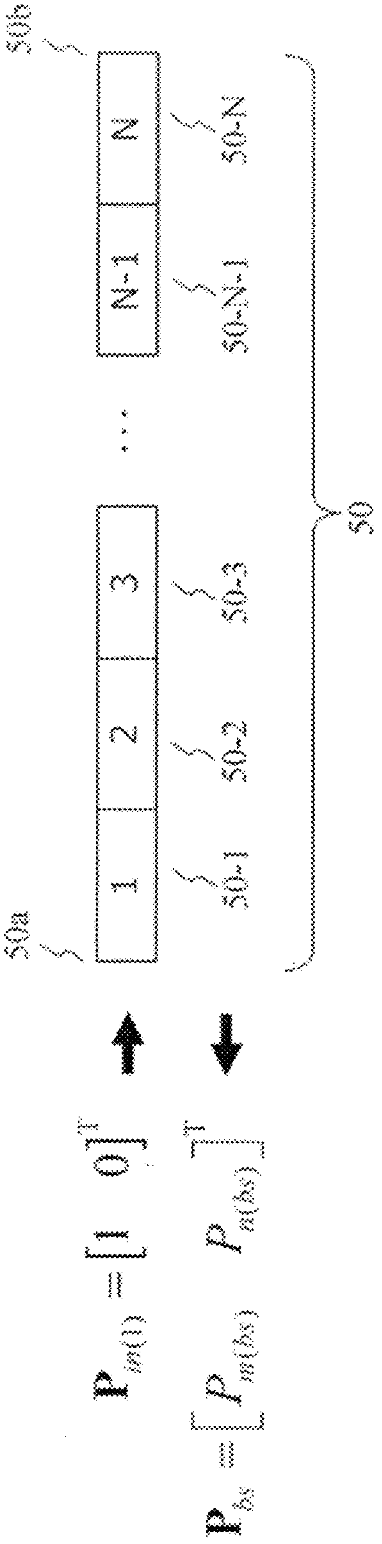
FIG. 6 illustrates an example of a calculation model of backscattered light $P_{bs}$.

There is still room for consideration when the optical fiber 50 under test is a transmission line in which N uncoupled multi-core fibers 50-1 to 50-N are connected in series as illustrated in FIG. 6. Given that signal light is injected only into the core #m of the transmission line, the backscattered light $P_{bs}$ received by the reception unit 13 connected to the one end 50*a* of the optical fiber 50 under test, which is expressed by the following equations.

[Math. 1]

$$P_{in(1)} = [\,1 \quad 0\,]^T \tag{1}$$

[Math. 2]

$$P_{bs} = [\,P_{m(bs)} \quad P_{n(bs)}\,]^T \tag{2}$$

Here, $P_{in(1)}$ denotes signal light injected into the one end 50*a* of the optical fiber 50 under test, $P_{m(bs)}$ denotes the backscattered light R1 output from the core #m, and $P_{n(bs)}$ denotes backscattered light output from the core #n. Because the backscattered light $P_{(bs)}$ is small in the present disclosure, the backscattered light $P_{n(bs)}$ is obtained by calculation instead of measuring optical power in the reception unit 13.

The backscattered light $P_{n(bs)}$ accumulated along an entire fiber length L of the core #n can be expressed by the following equation.

[Math. 3]

$$P_{n(bs)} = \int_0^L P_n(z)dz \tag{3}$$

Bidirectional crosstalk (logarithmic expression) in the core #n in which an influence of the connection point included in the entire transmission line is considered can be calculated, with the following equation, by taking the power ratio of $P_{n(bs)}$ to $P_{n(out)}$ in the core #n.

[Math. 4]

$$XT_b = 10\log_{10}\left[P_{n(bs)}/P_{n(out)}\right] \text{ (dB)} \tag{4}$$

(Derivation of $P_{n(bs)}$)

When signal light is injected into the one end 50*a* of the optical fiber 50 under test, signal light P(z) at a distance z, located in the k-th fiber section, from the one end 50*a* can be expressed by the following equation.

[Math. 5]

$$P(z) = M_k(z)T_{k-1}M_{k-1}T_{k-2}\ \ldots\ T_2M_2T_1M_1P_{in(1)} \tag{5}$$

Meanwhile, backscattered light $P_{bs(1)}(z)$ that originates from the signal light injected into on the one end 50*a* of the optical fiber 50 under test and returns from the distance z to the one end 50*a* can be expressed by the following equation.

[Math. 6]

$$P_{bs(1)}(z) = [P_m(z)\ \ P_n(z)]^T = M_1T_1M_2T_2 \ldots T_{k-2}M_{k-1}T_{k-1}M_k(z)BP(z) \quad (6)$$

Provided that matrices B, $T_i$, $M_i$, and $M_k(z)$ are found, signal light $P_{in(1)}$ injected into the one end 50$a$ of any core #m can be used for calculation through Equation (6) to bring about the backscattered light $P_{n(bs)}$ returning to the core #n adjacent thereto.

(Matrix B)

In Equation (6), B is a matrix denoting backscattering and can be approximated by constants with cores homogeneous.

(Matrix $T_i$)

In Equations (5) and (6), $T_i$ is a matrix denoting mode coupling at the i-th bend or connection point counted from the one end 50$a$, and is expressed by the following equation.

[Math. 7]

$$T_i = \begin{bmatrix} \eta_{11}^{(i)} & \eta_{12}^{(i)} \\ \eta_{21}^{(i)} & \eta_{22}^{(i)} \end{bmatrix} \quad (7)$$

Provided that mode coupling, between cores, occurring at the connection point is negligibly small in comparison with the mode coupling, between the cores, occurring in each fiber section of the uncoupled multi-core fiber, the mode coupling matrix $T_i$ at the connection point can be approximated by the following equation.

[Math. 8]

$$T_i \cong \begin{bmatrix} \eta_{11}^{(i)} & 0 \\ 0 & \eta_{22}^{(i)} \end{bmatrix} \quad (8)$$

$\eta_{11}^{(i)}$: coupling efficiency by connection of the core #m between a section i and a section i+1

$\eta_{22}$ (i): coupling efficiency by connection of the core #n between a section i and a section i+1

A connection loss between the fiber section i and the fiber section i+1 can be measured by using the backscattered light R1 and R2. Therefore, the crosstalk calculation unit 42 measures the connection loss between the fiber section i and the fiber section i+1 by using the loss distribution of the backscattered light R1, and obtains the coupling efficiency $\eta_{11}^{(i)}$ by the connection of the core #m between the fiber section i and the fiber section i+1 by using the connection loss. The crosstalk calculation unit 42 obtains the coupling efficiency $\eta_{22}^{(i)}$ by the connection of the core #n, as well as the coupling efficiency $\eta_{11}^{(i)}$, by using the backscattered light R2.

(Matrix $M_i$)

In Equations (5) and (6), $M_i$ is a mode coupling matrix denoting mode coupling in the i-th fiber section counted from the one end 50$a$, and is expressed by the following equation.

[Math. 9]

$$M_i = \begin{bmatrix} m_{11}^{(i)} & m_{12}^{(i)} \\ m_{21}^{(i)} & m_{22}^{(i)} \end{bmatrix} \quad (9)$$

The mode coupling matrix $M_i$ is expressed, as follows, by using a fiber loss factor α, a power coupling coefficient h, and a fiber length $L_i$ of the section i.

[Math. 10]

$$M_i = \begin{bmatrix} \exp(-\alpha L_i)\exp(-hL_i)\cosh(hL_i) & \exp(-\alpha L_i)\exp(-hL_i)\sinh(hL_i) \\ \exp(-\alpha L_i)\exp(-hL_i)\sinh(hL_i) & \exp(-\alpha L_i)\exp(-hL_i)\cosh(hL_i) \end{bmatrix} \quad (10)$$

The numerical values α and h can be measured in manufacturing the optical fiber 50 under test. Therefore, given that the fiber length $L_i$ of the fiber section i is determined, the mode coupling matrix $M_i$ can be calculated. Because the connection loss occurs between the fiber section i and the fiber section i+1, the fiber length $L_i$ of the fiber section i can be measured by using the loss distributions of the backscattered light R1 and R2. Therefore, the crosstalk calculation unit 42 calculates the fiber length $L_i$ of the fiber section i by using the loss distribution of the backscattered light R1 or R2.

(Matrix $M_k$)

$M_k(z)$ is a mode coupling matrix denoting mode coupling from an inlet to a position z of a fiber section k, and is expressed by the following equation.

[Math. 11]

$$M_k(z) = \begin{bmatrix} m_{11}^{(k)}(z) & m_{12}^{(k)}(z) \\ m_{21}^{(k)}(z) & m_{22}^{(k)}(z) \end{bmatrix} \quad (11)$$

k: the assigned number of the fiber section covering a distance z

Because the connection loss occurs between the fiber section i and the fiber section i+1, a position of the inlet of the fiber section k can be specified. The crosstalk calculation unit 42 calculates the position of the inlet of the fiber section k, calculates a fiber length ranging from the position of the inlet to the position z, and calculates the mode coupling matrix $M_k$ by using the calculated fiber length as the fiber length $L_i$ of Equation (10).

The backscattered light $P_{n(bs)}$ accumulated along an entire fiber length L of the core #n can be expressed by the following equation.

[Math. 12]

$$P_{n(bs)} = \int_0^L P_n(z)dz \quad (12)$$

The crosstalk calculation unit 42 can:

(i) calculate the mode coupling matrix $T_i$ by using the backscattered light R1 and R2;

(ii) calculate the mode coupling matrices $M_i$ and $M_k$ by using the backscattered light R1 or R2;

(iii) use the matrix B of constants; and thus (iv) calculate the backscattered light $P_{n(bs)}$ that originates from signal light injected into the core #m at the one end 50$a$ and returns to the adjacent core #n.

(Derivation of $P_{out}$)

Figure 7:
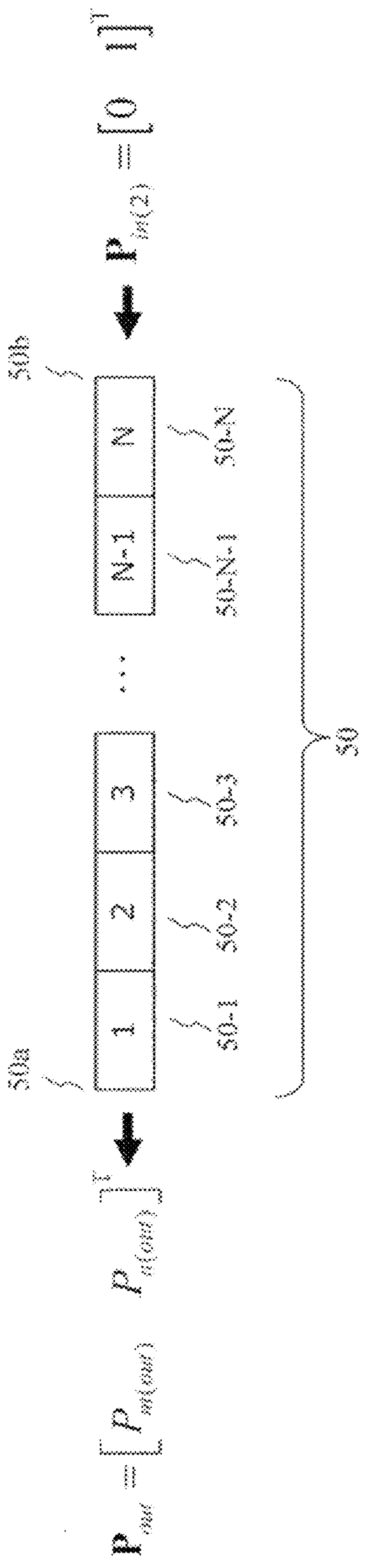
FIG. 7 illustrates an example of a calculation model of signal light $P_{out}$.

As illustrated in FIG. 7, the optical fiber 50 under test is a transmission line in which N uncoupled multi-core fibers 50-1 to 50-N are connected in series, and signal light output from the one end 50$a$ of the transmission line, occasioned by injecting signal light only into the core #n at the other end 50*b*, will be described. In this regard, the signal light $P_{out}$ output from each core of the one end 50*a* can be expressed by the following equations.

[Math. 13]

$$P_{in(2)} = [0 \quad 1]^T \tag{13}$$

[Math. 14]

$$P_{out} = [P_{m(out)} \quad P_{n(out)}]^T = M_1 T_1 M_2 T_2 \ldots T_{N-2} M_{N-1} T_{N-1} M_N P_{in(2)} \tag{14}$$

Here, $P_{in(2)}$ denotes signal light injected into the other end 50*b* of the optical fiber 50 under test.

As described above, the mode coupling matrices $T_i$ and $M_i$ can be calculated by using the backscattered light R1 and R2. Therefore, by using $P_{in(2)}$, the crosstalk calculation unit 42 can calculate the signal light $P_{n(out)}$ injected into the core #n at the other end 50*b* of the optical fiber 50 under test and output from the one end 50*a* of the core #n.

Here, optical power of the signal light injected into the core #n used in $P_{in(2)}$ has the same value as optical power of the signal light injected into the core #m used in $P_{in(1)}$. However, the optical powers may be different. In this regard, the difference between the optical powers of the signal light injected into each core only need to be corrected by multiplying a reciprocal of a ratio between the optical powers by the power ratio of $P_{n(bs)}$ to $P_{n(out)}$ in Equation (4).

The present embodiment enables the calculation of the backscattered light $P_{n(bs)}$ that originates from the signal light injected into the one end 50*a* of the core #m and is output from the one end 50*a* of the core #n and the signal light $P_{n(out)}$ that originates from the signal light injected into the other end 50*b* of the core #n and is output from the one end 50*a* of the core #n. Therefore, by using Equation (4), the crosstalk calculation unit 42 can calculate the bidirectional crosstalk $XT_b$ in the core #n where the influence of the connection point included in the entire transmission line is taken into account.

As described above, in the present disclosure, the mode coupling matrix $T_i$ at a bend point or connection point corresponds to a loss of each core and can be acquired from a change in intensity of backscattered light at the bend point or connection point. Further, the bidirectional crosstalk $XT_b$ can be calculated by using the known fiber loss factor α and power coupling coefficient h measured before the construction of the transmission line, the mode coupling matrix $T_i$ at the connection point obtained from the backscattered light, and the above equations of $P_{bs}$ and $P_{out}$.

Further, in the present disclosure, an influence of a bend or connection, in an uncoupled multi-core fiber transmission line, on bidirectional crosstalk can be calculated by comparing a known bidirectional crosstalk value measured before the construction of the transmission line with a value obtained by the above method.

The arithmetic processing unit 14 of the present disclosure can also be implemented on a computer and a program, and the program can be recorded in a recording medium or provided through a network. A program of the present disclosure is a program for being implemented on a computer as each functional unit included in the arithmetic processing unit 14 according to the present disclosure and is a program for instructing a computer to execute each step in a method executed by the arithmetic processing unit 14 according to the present disclosure.

REFERENCE SIGNS LIST

11 Test light generation unit
12 Input/output unit
21 Optical circulator
22 Optical switch
50 Optical fiber under test
13 Reception unit
31 Photoelectric converter
32 AD converter
14 Arithmetic processing unit
41 Waveform analysis unit
42 Crosstalk calculation unit
92 Input/output device
301 Optical transmission line test device

The invention claimed is:

1. A device, wherein
the device
detects a loss occurrence point of an optical fiber under test by using at least one of a loss distribution of first backscattered light from a first core included in the optical fiber under test when an optical pulse is injected into one end of the first core or a loss distribution of second backscattered light from a second core adjacent to the first core when an optical pulse is injected into one end of the second core,
calculates a mode coupling matrix $T_i$ at an i-th loss occurrence point of the optical fiber under test,
calculates a fiber length $L_i$ of an i-th fiber section having a separation at the i-th loss occurrence point of the optical fiber under test, and
calculates bidirectional crosstalk in the first core or the second core by using the calculated mode coupling matrix $T_i$ and fiber length $L_i$ and using a fiber loss factor α and power coupling coefficient h of the optical fiber under test measured in advance.

2. The device according to claim 1, wherein
the device
calculates backscattered light $P_{n(bs)}$ accumulated along an entire fiber length L of the second core, occasioned by injecting signal light into the one end of the first core, by using the mode coupling matrix $T_i$ at the i-th loss occurrence point, a mode coupling matrix $M_i$ indicating mode coupling in the i-th fiber section, and a matrix B indicating backscattering approximated by constants,
calculates signal light $P_{n(out)}$ output from the one end of the second core, occasioned by injecting signal light into the other end of the second core, and
calculates the bidirectional crosstalk in the second core by calculating a ratio between the backscattered light $P_{n(bs)}$ and the signal light $P_{n(out)}$.

3. The device according to claim 2, wherein
the device
calculates the mode coupling matrix $M_i$ indicating the mode coupling in the i-th fiber section of the optical fiber under test by using the calculated fiber length $L_i$ and the fiber loss factor α and power coupling coefficient h of the optical fiber under test,
calculates a fiber length from a position of an inlet to a position z of a fiber section k and calculates a mode coupling matrix $M_k(z)$ indicating mode coupling from the inlet to the position z of the fiber section k of the optical fiber under test by using the calculated fiber length and the fiber loss factor α and power coupling coefficient h of the optical fiber under test, and
applies the calculated mode coupling matrices $T_i$, $M_i$, and $M_k(z)$, the matrix B indicating backscattering approximated by constants, and signal light $P_{in(1)}$ injected into the one end of the first core to the following equations to calculate backscattered light $P_{n(bs)}$ in the second core.

[Math. C1]

$$P_{n(bs)} = \int_0^L P_n(z)dz \quad (C1)$$

[Math. C2]

$$P_{bs(1)}(z) = [P_m(z) \;\; P_n(z)]^T = M_1 T_1 M_2 T_2 \ldots T_{k-2} M_{k-1} T_{k-1} M_k(z) B P(z) \quad (C2)$$

[Math. C3]

$$P(z) = M_k(z) T_{k-1} M_{k-1} T_{k-2} \ldots T_2 M_2 T_1 M_1 P_{in(1)} \quad (C3)$$

4. The device according to claim 2, wherein the device calculates the mode coupling matrix $M_i$ indicating the mode coupling in the i-th fiber section of the optical fiber under test by using the calculated fiber length $L_i$ and the fiber loss factor α and power coupling coefficient h of the optical fiber under test, and applies the calculated mode coupling matrices $T_i$ and $M_i$ and signal light $P_{in(2)}$ injected into the other end of the second core to the following equation to calculate the signal light $P_{n(out)}$ in the second core.

[Math. C4]

$$P_{out} = [P_{m(out)} \;\; P_{n(out)}]^T = M_1 T_1 M_2 T_2 \ldots T_{N-2} M_{N-1} T_{N-1} M_N P_{in(2)} \quad (C4)$$

5. The device according to claim 1, wherein the device calculates first coupling efficiency $\eta_{11}$ at the i-th loss occurrence point of the optical fiber under test by using the loss distribution of the first backscattered light, calculates second coupling efficiency $\eta_{22}$ at the i-th loss occurrence point of the optical fiber under test by using the loss distribution of the second backscattered light, and calculates the mode coupling matrix $T_i$ at the i-th loss occurrence point of the optical fiber under test by using the calculated first coupling efficiency $\eta_{11}$ and second coupling efficiency $\eta_{22}$.

6. The device according to claim 1, further comprising:

a test light generation unit for generating the optical pulse; and a reception unit for receiving the first backscattered light and the second backscattered light.

7. A method comprising:

measuring first backscattered light from a first core included in an optical fiber under test when an optical pulse is injected into one end of the first core;

measuring second backscattered light from a second core adjacent to the first core when an optical pulse is injected into one end of the second core;

detecting a loss occurrence point of the optical fiber under test by using at least one of a loss distribution of the first backscattered light or a loss distribution of the second backscattered light;

calculating a mode coupling matrix $T_i$ at an i-th loss occurrence point of the optical fiber under test;

calculating a fiber length $L_i$ of an i-th fiber section having a separation at the i-th loss occurrence point of the optical fiber under test; and calculating bidirectional crosstalk in the first core or the second core by using the calculated mode coupling matrix $T_i$ and fiber length $L_i$ and using a fiber loss factor α and power coupling coefficient h of the optical fiber under test measured in advance.

8. A non-transitory computer-readable storage medium storing a program for being implemented on a computer as the device according to claim 1.

* * * * *